US000001415H

United States Statutory Invention Registration [19]

[11] Reg. Number: H1415

Merryman

[43] Published: Feb. 7, 1995

[54] SIGNAL PROCESSOR/ANALYZER WITH A NEURAL NETWORK COUPLED TO AN ACOUSTIC CHARGE TRANSPORT (ACT) DEVICE (ACT)

[75] Inventor: Ronald F. K. Merryman, Beavercreek, Ohio

[73] Assignee: The United States of America as represented by the Secretary of the Air Force, Washington, D.C.

[21] Appl. No.: 966,483

[22] Filed: Oct. 26, 1992

[51] Int. Cl.[6] ..... G06F 15/18

[52] U.S. Cl. ..... 395/22; 395/24

[58] Field of Search ..... 395/24, 22

[56] References Cited

U.S. PATENT DOCUMENTS

| | | | |
|---|---|---|---|
| 4,752,750 | 6/1988 | Zimmerman et al. | 333/166 |
| 4,884,001 | 11/1989 | Sacks et al. | 310/313 |
| 4,884,216 | 11/1989 | Kuperstein | 364/513 |
| 4,918,617 | 4/1990 | Hammerstrom et al. | 364/513 |
| 5,008,833 | 4/1991 | Agranat et al. | 395/25 |
| 5,063,390 | 11/1991 | Konig | 342/375 |
| 5,067,095 | 11/1991 | Peterson et al. | 395/24 |
| 5,109,351 | 4/1992 | Simar, Jr. | 395/24 |

OTHER PUBLICATIONS

Bill J. Hunsinger–Saw's Enable the Advent of the Signal Microprocessor Development Station–1990 IEEE. Neural Computing by Philip D. Wasserman Van Nostrand Reinhold (N.Y).

*Primary Examiner*—Bernarr E. Gregory
*Attorney, Agent, or Firm*—Bernard E. Franz; Thomas L. Kundert

[57] ABSTRACT

The Unique Neural Network Signal Processor/Analyzer (UNSPA), for real-time analysis of analog signals, involves combining acoustic charge transport (ACT) device(s) and an artificial neural network processor on a single, monolithic substrate. The ACT will act as input to the neural network. The UNSPA will allow non-destructive, high-speed, real-time signal analysis with improved performance and decreased size over conventional methods. The UNSPA can function as, but is not limited to, signal classification, prediction or error detection. Applications for such functions could be: target or speech recognition, signal prediction, sensor fusion, adaptive control, image classification, in-line error detection.

3 Claims, 2 Drawing Sheets

Microfiche Appendix Included
(07 Microfiche, 966483 Pages)

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SIGNAL PROCESSOR/ANALYZER WITH A NEURAL NETWORK COUPLED TO AN ACOUSTIC CHARGE TRANSPORT (ACT) DEVICE (ACT)

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a Unique Neural Network Signal Processor/Analyzer (UNSPA), and more particularly to a Processor/Analyzer which will allow real-time analysis of analog signals.

Currently, real-time analysis can be accomplished via analog-to-digital converters with digital circuity, then reconstructed by digital-to-analog converters. This method results in quantization errors, degradation of signal and long processing delays. Even if artificial neural networks (henceforth neural nets) are used for analysis, the signal must first be put though an A/D converter (digitized), and then the digital word is analyzed via a microprocessor neural net system (usually a software program in a computer). This method also suffers quantization errors, and requires a large computer system for the neural net.

The following U.S. patents relating to neural networks are of interest.

U.S. Pat. No. 5,109,351—Simar
U.S. Pat. No. 5,067,095—Peterson et al
U.S. Pat. No. 4,918,617—Hammerstrom et al
U.S. Pat. No. 4,884,216—Kuperstein The patent to Peterson discloses the known usage of artificial neural networks but lacks any discussion of acoustic charge transport. The patent to Hammerstrom et al discloses neural-model computation system with multi-directionally overlapping broadcast. The patent to Kuperstein discloses a neural system for adaptive sensor-motor coordination of multijoint robots for single postures. The patent to Simar discloses backward pass learning methods for feedforward neural type devices and network architectures for these methods.

The following United States patents relating to Acoustic Charge Transport (ACT) are of interest:

U.S. Pat. No. 4,752,750—Zimmerman et al
U.S. Pat. No. 4,884,001—Sacks et al
U.S. Pat. No. 5,063,390—Konig The patent to Sacks et al discloses a novel heterojunction acoustic charge transport device which includes a modulation doped field effect transistor (MODFET) on the same substrate. The device may be comprised of GaAs and AlGaAs which is both piezoelectric and semiconducting. The patents to Zimmerman et al and Konig show ACT devices with taps.

SUMMARY OF THE INVENTION

An objective of the invention is to provide a Processor/Analyzer which will allow non-destructive, high-speed, real-time signal analysis with improved performance and decreased size over conventional methods.

The invention relates essentially to a Unique Neural Network Signal Processor/Analyzer (UNSPA) which will allow real-time analysis of analog signals. This invention involves combining acoustic charge transport (ACT) device(s) and an artificial neural network processor on a single, monolithic substrate. The ACT will act as input to the neural network.

This invention can function as, but is not limited to, signal classification, prediction or error detection. Applications for such functions could be: target or speech recognition, signal prediction, sensor fusion, adaptive control, image classification, and in-line error detection.

DETAILED DESCRIPTION

Acoustic charge transport (ACT) devices enable analog signals to be non-destructively sensed via taps along the surface of the device. Neural nets allow data to be studied in a non-traditional method, yielding unique results for pattern recognition, prediction, classification and adaptive processing. Combining ACT with neural nets in a monolithic gallium-arsenide (GaAs) implementation will result in a powerful, new real-time signal analysis device.

Figure 1:
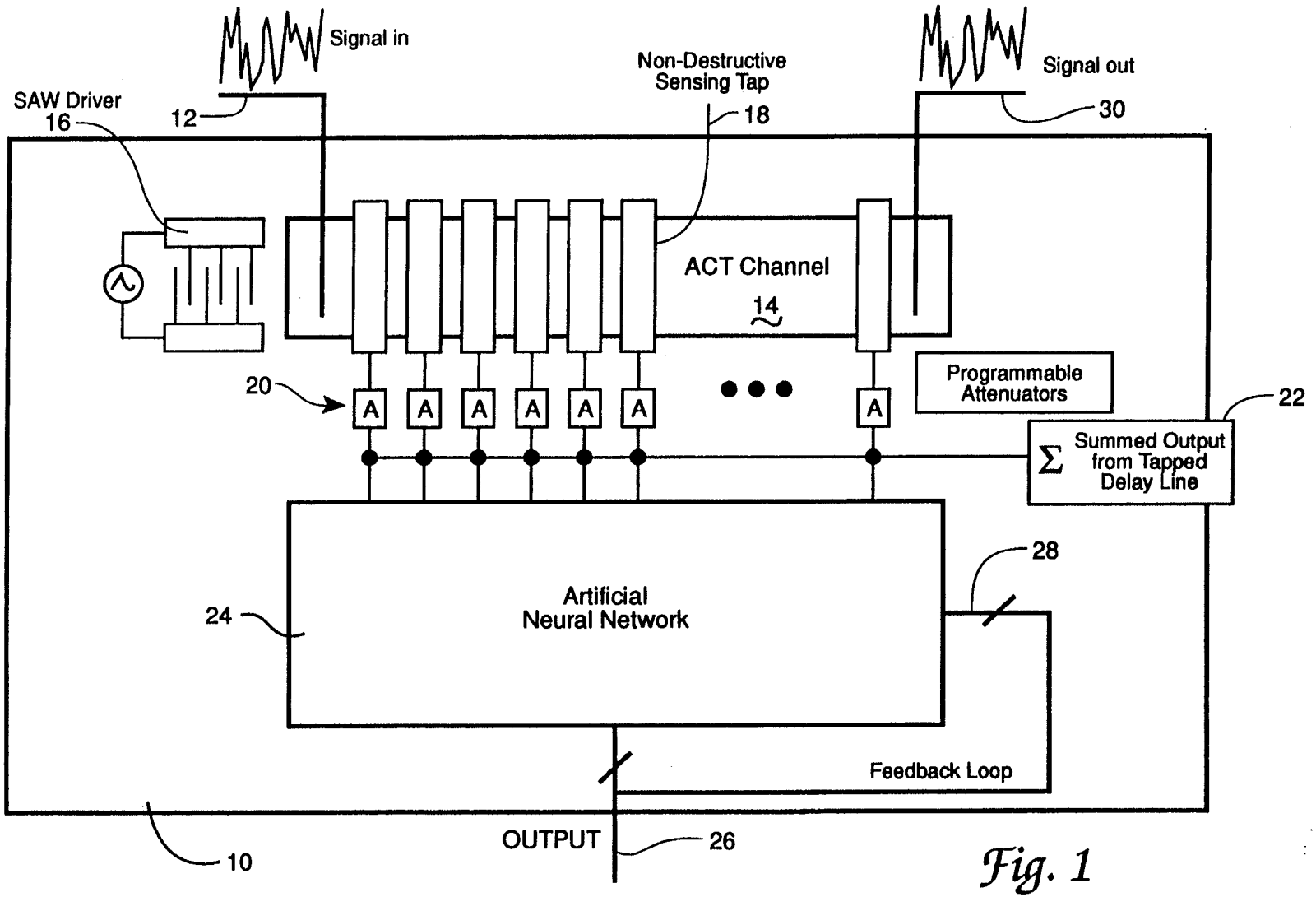
FIG. 1 is a diagram showing an acoustic charge transport device (ACT) and an artificial neural network processor on a single, monolithic substrate.

Referring to FIG. 1, there is shown a combination of acoustic charge transport with artificial neural networks, which is believed to be a novel idea with many intrinsic advantages. Since the UNSPA is to be built on a monolithic GaAs chip 10 it will be small and compact. ACT requires less power than ADCs and have a transfer efficiency better than 0.9999 with no quantization error. The ACT is composed of an input on line 12, a channel 14 and a surface acoustic wave driver 16. The taps 18 will sense the charge of the signal in the channel, which can be attenuated in attenuators 20 and a summed output 22 created. This summed output ($\Sigma$) can be used directly as a filtered signal or input to the neural net 24 for error calculation (or other functions). Each tap will be an input to a neural network 24 whose output on line 26 can be fed back at line 28 to the neural net for training, etc. The original signal can exit the ACT at line 30 virtually unchanged.

The processor/analyzer will be versatile in its design: the tap quantity and spacing is selectable; the type of neural net is selectable (n-layer back-propagation, feedback/feedforward and lateral inhibition, Kohonen, time delay neural net, etc. . . .). The speed of the UNSPA will allow real-time analysis of high frequency signals which previously could not be analyzed in real-time.

Figure 2:
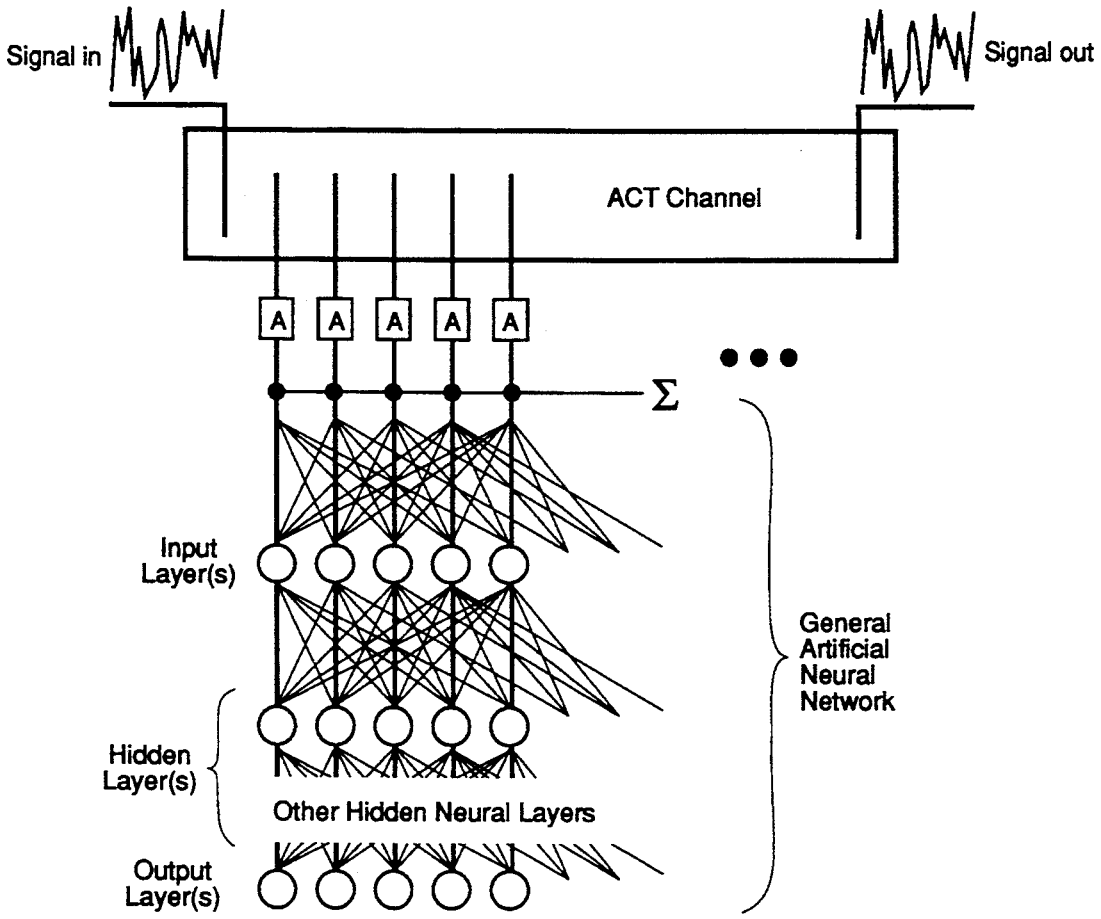
FIG. 2 is a diagram showing a processor/analyzer implemented with a generic neural network.

ALTERNATIVES: FIG. 2 shows the processor/analyser implemented with a generic neural network. Many types of neural nets may be substituted for the genetic form. The function of the processor/ analyzer will be determined by the type of neural net used. These functions may comprise, but are not limited to:

Signal Classification
Signal Prediction
Error Detection
Signal/Data Fusion
Adaptive Control Multiple devices may be combined to provide for n-dimensional analysis. The neural nets may be trained on-chip or trained off-chip with the weights loaded onto the chip. A total hardware implementation will gain in the area of speed and compactness, while a hardware/software implementation will provide greater flexibility in design.

Basic UNSPA Operation

1) A signal at line 12 is sampled by a surface acoustic wave (SAW) device at its input contact (source).

2) Charge packets are transported in the ACT-/HACT channel 14.

3) Taps over the transport channel non-destructively sense the charge in the packets passing beneath.

4) The output voltage on each tap may vary from 50 microvolts–100 millivolts, depending upon the input voltage.

5) By attenuating the tap outputs with the attenuators 20, the signal can be normalized before input to the artificial neural network 24.

6) The normalized data enters the "neurons" and is multiplied by a weighting variable (see note below), then all inputs to each neuron are summed. This sum is passed through a thresholding function and this value is passed to the next level of "neurons".

7) Depending on the function of the system, the final output may be compared to a "desired" output (during training). The difference between these values are used to adjust the weights of the neurons. This continues until the difference is minimized to a specified level.

8) Once the network is "trained", normal operation of the UNSPA can commence.

9) The charge packets continue in the ACT channel until they are extracted at the output (drain). The efficiency of the transport channel exceeds 0.99995.

NOTE: The example in 6) and 7) above was for a generic, multi-level, back propagation network system. Other neural paradigms exist and will differ in structure as well as function. Other types of neural networks that can be used in UNSPA are: Kohonen self-organizing networks, counter propagation (feedforward), localized receptive field networks, adaptive resonance theory, and time-delay neural networks. All these networks can be connected to the ACT device taps in a similar way. The choice of a particular network paradigm will be dependent on what function is desired from UNSPA as well at the input signal characteristics.

Error Detection Function

Depending on the system, errors will tend to be aberrations and will therefore occur as low probability events. The UNSPA can be used to detect when these aberrations occur during normal system operation. This can be accomplished "in-line" without degradation to system signals. A threshold hold level can be adjusted to control the degree of error detection (i.e. to minimize minor aberrations being called "errors"). Fuzzy logic can also be implemented to provide a "certainty factor" when aberrations are encountered.

One method of training such a system is implementing an unsupervised learning algorithm such as a Kohonen networks, Adaptive Resonance Theory (ART) networks, or self-organizing localized receptive fields. These algorithms are useful when data is acquired at high rate and cannot be saved and fast processing is required (real-time applications). These "self-organizing" paradigms are excellent for sorting data into classes. By using input data parameters, the network clusters "like" data in classes on the hyperplane. For example, in this application, these classes could be:

Normal Operation, Error type 1, Error type 2, . . . etc. A percentage of certainty could be associated, such as:

[ 80% likely Error type 3
20% likely Unknown/New Error ]

Figure 3:
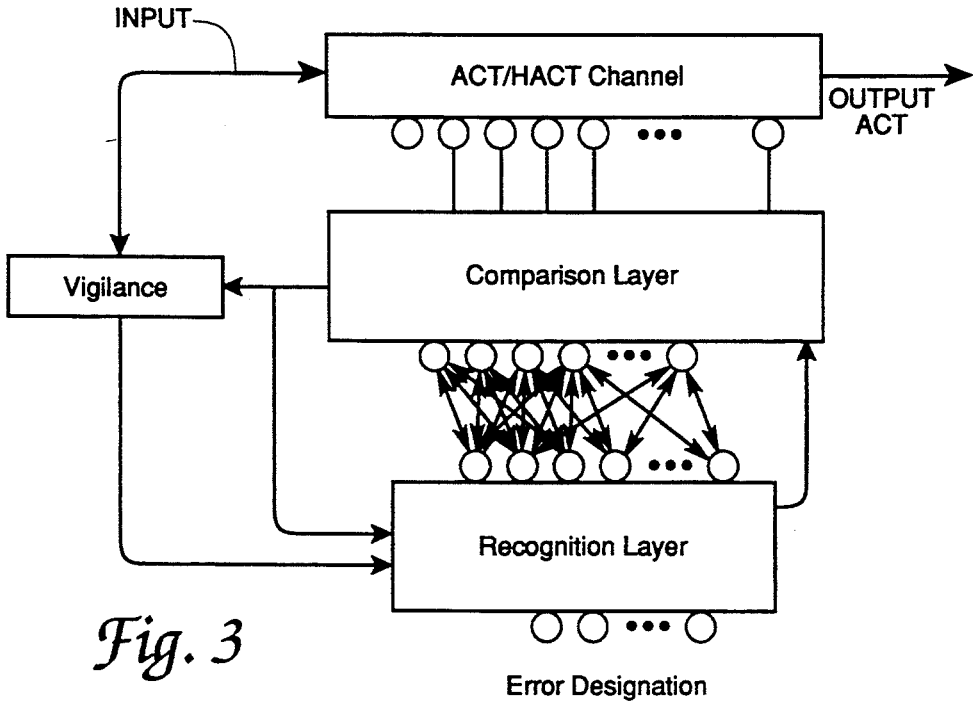
FIG. 3 is a diagram showing an error designation structure for a processor/analyzer utilizing an Adaptive Resonance Theory (ART) network.

For example, the structure of UNSPA utilizing an ART2 network is shown in FIG. 3.

The analog signals from the taps off the ACT enter the Comparison Layer. There are weights between all layers: to and from (not all are shown). Via feedback and weight adjustment between the neurons of the Comparison and Recognition levels, inputs are either clustered with prior exemplars or become a new cluster exemplar. The vigilance is the distance scalar which determines classification: if the "distance" between an input and its closest examplar are less that the vigilance, then it is clustered with that class; otherwise, a new cluster is formed for that input.

A VLSI implementation of the neural portion of UNSPA would be in the range of 10K to 100K gates, depending on the number of taps of the ACT channel and the complexity of the total system. A software/-hardware implementation of this system would be simpler, but slower. Neural network chips exist which could be adapted to connect to the ACT taps and would be software controllable.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A signal processor/analyzer for real-time analysis of analog signals, comprising an acoustic charge transport device (ACT) and an artificial neural network processor, combined on a single, monolithic GaAs substrate;

wherein the acoustic charge transport device comprises a channel, a surface acoustic wave driver coupled to the channel, an input contact coupled to a signal input line for an analog signal, a plurality of taps for sensing the charge of a signal in the channel, and an output contact coupled to a signal output line at which the analog signal can exit;

each tap of the acoustic charge transport device being coupled via an attenuator to means for summing and to an input of the artificial neural network processor, a summed output being created in the summing means, the artificial neural network processor having an output which can be fed back to the artificial neural network processor for training and other purposes.

2. A method of signal processing and analysis for real-time analysis of analog signals, comprising the steps of:

a) sampling a signal using a surface acoustic wave (SAW) device at an input contact (source);

b) transporting charge packets in an acoustic charge transport device (ACT) channel, there being a plurality of taps over the channel;

c) non-destructively sensing the charge in packets passing the taps;

d) attenuating the signal at outputs from the taps, to normalize the signal to provide normalized data before input to an artificial neural network having a plurality of "neurons" organized in levels;

e) multiplying the normalized data entering the "neurons" by a weighting variable, then summing all inputs to each neuron; a resulting sum being passed through a thresholding function and a resulting value being passed to a next level of "neurons";

f) the charge packets continuing in the ACT channel until said charge packets are extracted at an output.

3. A method of signal processing and analysis according to claim 2, further comprising the steps of:

comparing a final output value to a "desired" output value during training, using the difference between these values to adjust weights of the neurons, continuing until the difference is minimized to a specified level.

* * * * *